United States Patent [19]
Inaba et al.

[11] 3,761,755
[45] Sept. 25, 1973

[54] IMPROVED ROTOR

[75] Inventors: Seiuemon Inaba; Kanryo Shimizu; Shigeaki Oyama, all of Kawasaki, Japan

[73] Assignees: Fujitsu Limited, Kawasaki; Fujitsu Fanc Limited, Tokyo, Japan

[22] Filed: Aug. 18, 1972

[21] Appl. No.: 281,643

[30] Foreign Application Priority Data
Aug. 24, 1971 Japan.............................. 46/75999
Aug. 24, 1971 Japan.............................. 46/76001

[52] U.S. Cl. ............................. 310/268, 310/49 R
[51] Int. Cl. ............................................. H02k 1/28
[58] Field of Search .......................... 310/268, 49 R

[56] References Cited
UNITED STATES PATENTS
2,550,571  4/1951  Litman........................... 310/268 X
3,502,914  3/1970  Cox................................ 310/49 R Primary Examiner—Gerald Goldberg
Attorney—Allan Ratner

[57] ABSTRACT

An electric pulse motor which has a rotatably supported rotor and a stator assembly including a number of stator elements stationarily arranged around the rotor so that stator teeth of the stator elements axially oppose beyond the rotor via air gaps, the rotor comprising a plurality of rotor teeth, each being consituted by stacking a plurality of laminations, and an index support means provided with a plurality of rotor tooth insert slots arranged therein equiangularly in the circumferential direction of said rotor, said plurality of rotor teeth being inserted in said insert slots of said index support means and being connected to said index support means by a connecting means.

3 Claims, 15 Drawing Figures

IMPROVED ROTOR

DESCRIPTION OF THE INVENTION

The present invention relates to an improvement of such an electric pulse motor as includes a rotor rotatably supported in casings and a stator assembly having a number of stator elements stationarily mounted in the casings while being arranged around the rotor so that stator teeth of the stator elements axially oppose beyonds the rotor via air gaps, and more particularly to an improved structure of the rotor of this type of electric pulse motor.

In order to avoid eddy current generating in response to change in the amount of magnetic flux, it is well known to provide a laminated structure of a rotor for an electric pulse motor. It is also well known that in the electric pulse motor of the type specified above, the rotor must be of a structure in which the individual rotor teeth are mounted on a certain mounting element, in view of the laminated structure of the rotor. This structure of the rotor, however, must often be complicated and weakens the rigidity of the rotor whereby the speed of rotation of the rotor must be restricted.

It has already been proposed to reinforce the physical strength of the rotor. However, the conventional structure for reinforcing the rotor is again complicated and increases in the production operation and cost are encountered.

Therefore, an object of the present invention is to obivate defects of the conventional electric pulse motor by using a simple but rigid support means for fixedly positioning a plurality of rotor teeth.

According to one of the features of the present invention, a rotor of an electric pulse motor comprises a plurality of rotor teeth, each being constituted by stacking a plurality of laminations, and an index support means provided with a plurality of rotor tooth insert slots arranged equiangularly in the circumferential direction of the rotor. Said plurality of rotor teeth are positioned in said plurality of insert slots, of said index support plate, and are connected to said index support means by a connecting means.

The present invention will be apparent from the ensuing description of several embodiments with reference to the accompanying drawings in which:

FIG. 5b is a partial side elevation view with part section of a modification of the rotor of FIG. 5a;

Figure 1B:
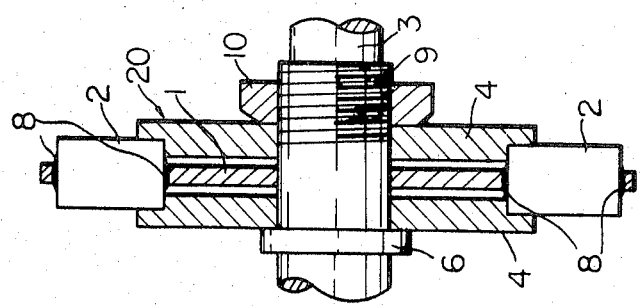
FIG. 1a and FIG. 1b are a front and a side elevation view with part section of an embodiment of a rotor according to the present invention.
Figure 1A:
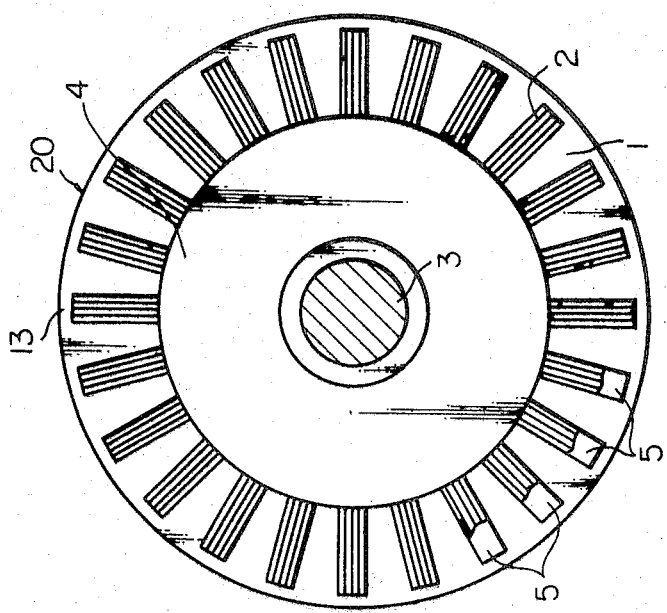
Figure 7:
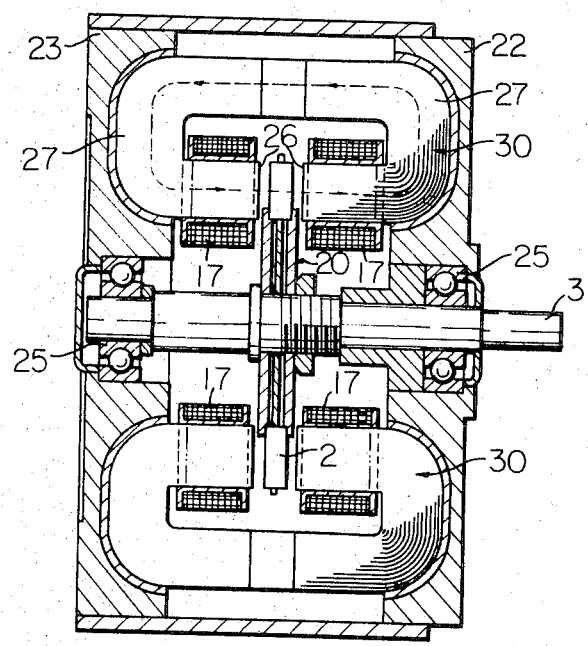

FIGS. 6a thru 6d are front views of various examples of laminations for a rotor tooth according to the present invention;

FIG. 7 is a longitudinal sectional view schematically showing an electric pulse motor incorporating a rotor as shown in FIGS. 1a and 1b.

Referring now to FIG. 1a and FIG. 1b, an index support plate 1 having a plurality of rotor tooth insert slots 5 formed therein, and equiangularly arranged in the circumferential direction about a central axis of the plate, is mounted on a rotor shaft 3. In respective slots 5 of the index support plate 1, a plurality of rotor teeth 2, each constituted by stacking a plurality of laminations, are inserted and positioned so that the stacking direction of the laminations is identical with the circumferential direction of the rotor. Thus, magnetic flux flowing through the rotor tooth in the direction of the central axis of rotor shaft 3 is prevented from generating eddy current in each rotor tooth 2 carried by the index support plate 1. It should be noted, however, that the rotor teeth 2 may be positioned in the slots 5 so that the stacking direction is in the radial direction of the rotor.

Figure 2A:
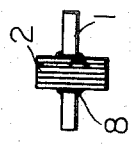
FIG. 2a and FIG. 2b are a partial section view and a plan view illustrating a connection between a rotor tooth and an index support plate by means of mechanical staking.
Figure 3A:
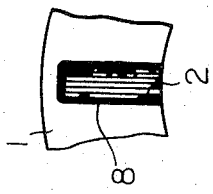
FIG. 3a and FIG. 3b are a partial section view and a plan view illustrating another connection between a rotor tooth and an index support plate by means of brazing or adhesion.
Figure 2B:
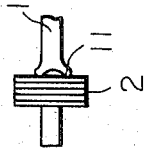
Figure 3B:
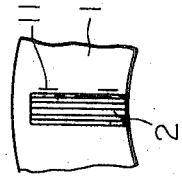

Connection between inserted rotor teeth 2 and support plate 1 may be accomplished merely by means of brazing or adhesion as indicated by reference numeral 8 in FIG. 3a and FIG. 3b. The connection may also be accomplished by means of mechanical staking as indicated by reference numeral 11 in FIG. 2a and FIG. 2b. The selection of the connecting means is determined depending upon material used for making the index plate 1. That is, if non magnetic metal material such as aluminum is used, brazing or mechanical staking may be conveniently used for rigid connetion. However, of non magnetic and non conductive material such as ceramic, glass epoxy, or epoxy-modified polyimide material is used, adhesion must be used.

Preferably, the above-mentioned non-magnetic and non conductive material is used for making the index support plate 1. This is in order to prevent generation of eddy current in the support plate 1, and also, leakage of magnetic flux from the rotor-teeth into the index support plate.

The index support plate 1 is physically reinforced by support plates 4 attached on each side of the plate 1. The support plates 4 serve also for supporting the rotor teeth 2. The rotor body 20, consisting of index support plate 1, a plurality of rotor teeth 2 and support plates 4, is attached to a flange portion 6 of rotor shaft 3. The rotor body 20 is rigidly fixed on the shaft 3 by a threaded portion 9 and a nut 10 engaged with the threaded portion 9.

From the foregoing, it can be understood that a simple and rigid structure of the rotor is provided.

Figure 6A:
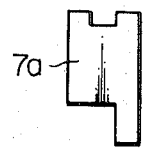
Figure 6B:
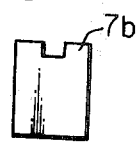
Figure 6C:
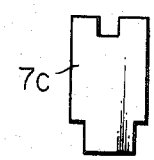
Figure 6D:
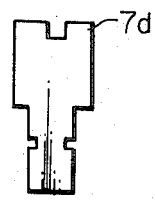
Figures 4A, 4B:
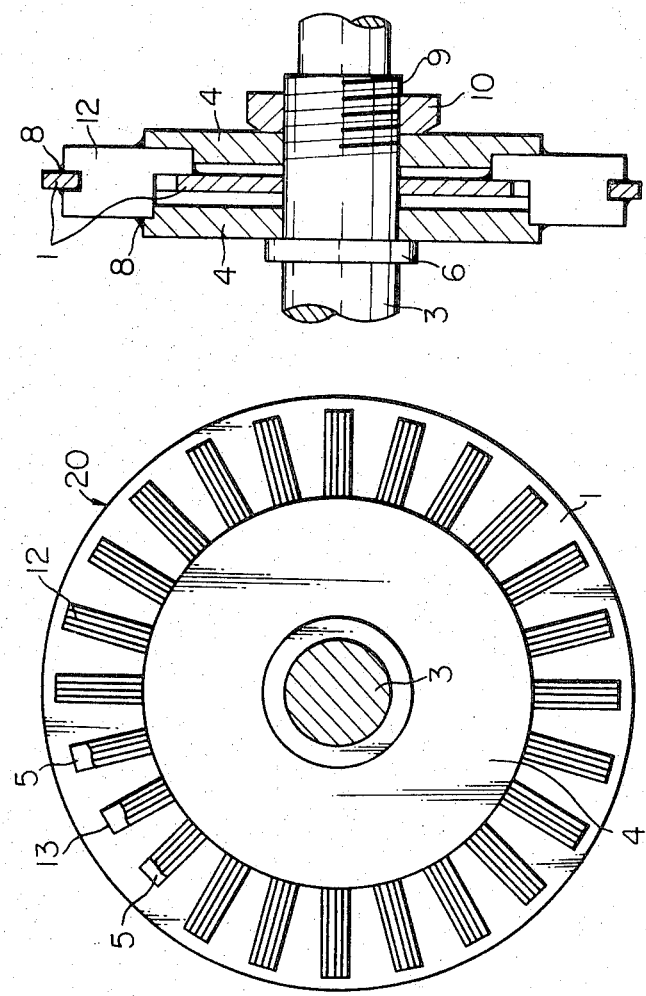
FIG. 4a and FIG. 4b are a front and a side elevation view with part section of another embodiment of a rotor according to the present invention.

FIGS. 4a and 4b illustrate another embodiment of a rotor according to the present invention, and the same reference numerals indicate the same elements as the embodiment of FIGS. 1a and 1b. In this embodiment, a plurality of rotor teeth 12, each constituted by stacking a plurality of laminations 7a which have notches at the upper and lower ends as shown in FIG. 6a, are inserted in respective insert slots 5 of the index support plate 1. It should be noted that the notches, formed at the radially outermost edges of respective rotor teeth 12, are engaged with marginal portion 13 of the index support plate 1 after the teeth 12 are inserted. It should also be noted that the stacking direction of the rotor laminations is identical with the circumferential direction of the rotor. This is the same as in the case of the embodiment of FIGS. 1a and 1b.

Marginal portion 13 of index plate 1 is defined as the portion between the outer periphery of index support plate 1 and each outermost edge of slot 5 provided in the index support plate.

Each rotor tooth 12 is inserted in a slot 5 and is fixed to index support plate 1 by means of brazing or adhesion 8 as shown in FIG. 4b. It will be understood that each rotor tooth 12 may also be fixed to support plates 4 by means of brazing or adhesion 8 as shown in FIG. 4b.

Figure 5A:
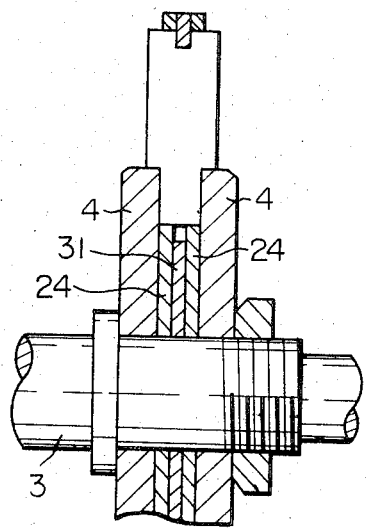
FIG. 5a is a side elevation view with part section and cut away of further embodiment of a rotor according to the present invention.
Figure 5B:
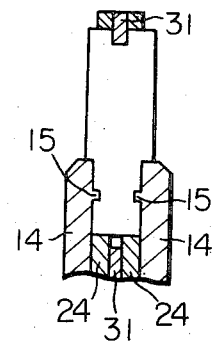

FIG. 5a and FIG. 5b illustrate further embodiments of the rotors according to the present invention in which respective rotor teeth are constituted by stacking the laminations 7c and 7d, respectively. In both of these embodiments, it should be noted that the shape of an index support plate 31 varies from that of index plate 1, in order to correspond to the shape of the laminations 7c and 7d. Also, support plates 14 are provided with lugs 15 engageable with notches of the rotor, for the purpose of accurately positioning the rotor teeth as shown in FIG. 5b. Numeral 24 in FIGS. 5a and 5b show further support plates which are provided for the purposes of further reinforcement of the index plate 31 and accurate support of the rotor teeth in the plate 31.

FIG. 7 shows an example of an electric pulse motor incorporating the rotor of FIGS. 1a and 1b according to the present invention. As shown in FIG. 7, the rotor 30 is rotatably supported by bearings 25 seated in the housings 23, 24. Each rotor tooth of the rotor has small axial air gaps on each side facing stator teeth 26. Each stator element 30 is comprised of a pair of laminated cores 27, stator teeth 26 formed on an end surface of each core 27, and excitation windings 17 on the cores 27 for exciting the stator element 30. Each stator element 30 is arranged stationarily in the housing 22, 23. In this way, magnetic flux departing from the excited stator elements 30, flows through the laminated tooth poles of the rotor tooth in the axial direction with respect to the central axis of the rotor shaft. This results in reduction of the generation of eddy current in the rotor teeth when magnetic attractive force is generated in order to rotate the rotor. As a result, iron loss due to eddy current is minimized so that the efficiency of the electric pulse motor can be raised. Also, the rigidly structured rotor of the present invention will never be affected by the axial force resulting from an axial element of the magnetic attractive force acting between the rotor and the stator assembly.

From the foregoing it can be understood that, according to the present invention, generation of eddy current in the rotor teeth is reduced to the minimum possible, and; simultaneously, a simple and rigid mounting structure of the rotor teeth can be provided without difficulty in production and at a low production cost of the electric pulse motor.

What is claimed is:

1. In an electric pulse motor including a rotor mounted on a rotor shaft which is rotatably supported in casings, and a stator assembly having a number of stator elements stationarily mounted in the casings while being arranged around the rotor so that stator teeth of the stator elements axially oppose beyond the rotor via air gaps, an improvement wherein said rotor comprises:

a plurality of rotor teeth, each being constituted by stacking a plurality of laiminations;

an index support means mounted on a rotor shaft and provided therein with a plurality of slots which are equiangularly arranged in a circumferential direction of said rotor for receiving the rotor teeth so that each lamination of said respective rotor teeth has its surfaces directed in the circumferential direction of said rotor within said slot;

means for securing said plurality of rotor teeth to said index support means;

a pair of support members having said index support means disposed therebetween for supporting said rotor teeth secured in said slots of said index support means, and;

means for threadedly engaging said support members to said rotor shaft.

2. An electric pulse motor as claimed in claim 1, wherein each of said plurality of rotor teeth comprises at least a notch formed at an end thereof to thereby be engaged with a marginal portion of said index support means.

3. An electric pulse motor as claimed in claim 2, wherein said index support means is made of nonmagnetic and nonconductive material.

* * * * *